United States Patent
Yacout et al.

(10) Patent No.: US 11,406,960 B2
(45) Date of Patent: Aug. 9, 2022

(54) MATERIALS AND METHODS FOR SELECTIVE NOBLE GAS ADSORPTION

(71) Applicant: UCHICAGO ARGONNE, LLC, Chicago, IL (US)

(72) Inventors: Abdellatif M. Yacout, Naperville, IL (US); Sumit Bhattacharya, Darien, IL (US); Yinbin Miao, Aurora, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 494 days.

(21) Appl. No.: 16/583,851

(22) Filed: Sep. 26, 2019

(65) Prior Publication Data
US 2021/0094015 A1   Apr. 1, 2021

(51) Int. Cl.
| | |
|---|---|
| *B01D 53/04* | (2006.01) |
| *B01J 20/18* | (2006.01) |
| *B01J 20/02* | (2006.01) |
| *B01J 20/28* | (2006.01) |
| *B01J 20/30* | (2006.01) |
| *B01J 20/32* | (2006.01) |
| *B01D 53/02* | (2006.01) |

(52) U.S. Cl.
CPC ............ *B01J 20/183* (2013.01); *B01D 53/02* (2013.01); *B01J 20/0225* (2013.01); *B01J 20/28064* (2013.01); *B01J 20/28083* (2013.01); *B01J 20/28097* (2013.01); *B01J 20/3078* (2013.01); *B01J 20/3204* (2013.01); *B01J 20/3225* (2013.01); *B01J 20/3236* (2013.01); *B01D 2253/106* (2013.01); *B01D 2253/1122* (2013.01); *B01D 2253/25* (2013.01); *B01D 2257/11* (2013.01)

(58) Field of Classification Search
CPC .. B01D 53/02; B01D 53/04; B01D 2253/104; B01D 2253/106; B01D 2253/1122; B01D 2253/1124; B01D 2253/25; B01D 2253/306; B01D 2253/34; B01D 2253/3426; B01D 2257/11; B01J 20/0225; B01J 20/183; B01J 20/28064; B01J 20/28083; B01J 20/28097; B01J 20/3078; B01J 20/3204; B01J 20/3225; B01J 20/3236
USPC ............ 96/108, 153, 154; 95/127, 900, 902
See application file for complete search history.

(56) References Cited

U.S. PATENT DOCUMENTS

| | | | | |
|---|---|---|---|---|
| 6,693,055 | B2* | 2/2004 | Yoon ...................... | B82Y 30/00 502/4 |
| 2004/0166340 | A1* | 8/2004 | Cairns .................. | C03C 17/3607 428/472 |
| 2009/0302001 | A1* | 12/2009 | Mayers .................. | B82Y 40/00 216/54 |
| 2015/0197856 | A1* | 7/2015 | Tria .................... | C23C 18/1879 428/206 |

OTHER PUBLICATIONS

Aaltonen et al., Atomic Layer Deposition of Platinum Thin Films, Chem. Mater., 15(9):1924-8 (2003).
(Continued)

*Primary Examiner* — Frank M Lawrence, Jr.
(74) *Attorney, Agent, or Firm* — Marshall, Gerstein & Borun LLP

(57) ABSTRACT

An adsorptive material for adsorption of a noble gas can include a mesoporous support material having a plurality of pores and a pattern of metal atoms deposited onto the mesoporous support material.

13 Claims, 4 Drawing Sheets

(d)

Nano-Pillars (56) References Cited

OTHER PUBLICATIONS

Chen et al., The role of van der Waals interactions in the adsorption of noble gases on metal surfaces, J. Phys.: Condens. Matter 24 424211 (2012).
Griffiths et al., Atomic Layer Deposition of Gold Metal, Chem. Mater., 28(1):44-46 (2016).
Li et al., Atomic Layer Deposition of Ultrathin Copper Metal Films from a Liquid Copper(I) Amidinate Precursor, J. Electrochem. Soc., 153(11): C787 (2006).
Mäkelä et al., Studies on Thermal Atomic Layer Deposition of Silver Thin Films, Chem. Mater., 29(5):2040-5 (2017).
Pershina et al., Adsorption of inert gases including element 118 on noble metal and inert surfaces from ab initio Dirac-Coulomb atomic calculations, J. Chem. Phys., 129(14):144106 (2008).
Weber et al., Atomic Layer Deposition of High-Purity Palladium Films from Pd(hfac)2 and H2 and O2 Plasmas, J. Phys. Chem. C, 118(16):8702-11 (2014).

* cited by examiner

SBA-15

MATERIALS AND METHODS FOR SELECTIVE NOBLE GAS ADSORPTION

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

BACKGROUND

Field of the Disclosure

The disclosure generally relates to adsorptive materials having a mesoporous support coated with a pattern of metal atoms and methods of making the same.

Brief Description of Related Technology

The handling of gaseous fission products, xenon and krypton, which are generated inside a nuclear fuel element has been a critical yet challenging task for reactor engineers. Xenon and Krypton are virtually completely insolubility in the fuel matrix, and their normal pure state is a gas rather than a condensed matter. This means that at all kinetically possible, xenon and krypton will be rejected from the fuel matrix and that the rejected gases either accumulates within the fuel matrix to form fission gas bubbles or is released into the fuel element's internal atmosphere. Either can compromises fuel performance, which in turn affects the efficiency of the reactor? Gaseous swelling leads to pellet-cladding mechanical interaction, and released fission gas increases the internal fuel element pressure. Both result in high cladding stress, which can cause fuel failure. In addition, the extent to which the fission gases are freed from the fuel determines in large part the potential hazard of a reactor core in the event of an accidental cladding breach, which can occur either at the reactor site or during transportation of the spent fuel to a reprocessing plant.

It is well understood and studied that yield rate of xenon as a fission product is significantly higher than krypton in a nuclear reactor [1]. As a result, methods for selective removal of xenon (Xe) from the fuel pins have been developed. Conventional methods including having a fuel element design that allows the release of the excess fission product gases into a plenum that is part of a fuel element, which comes at an additional expense to fuel and reactor construction. The other method for capturing Xe from process off-gas is cryogenic distillation, a highly capital-intensive process.

Advanced reactors such as gas fast reactors are built to achieve high burn-up and operate at high temperature, and use inert gas as high-temperature coolant. Fuel designs for such a reactor require release of fission gases from the fuel material during operation and require fuel cladding that can operate at high temperature. This leads to higher pressure of fission gases inside the fuel element, thus endangering the cladding itself and requires an adsorber that can operate at high temperature.

Conventionally, activated carbon, zeolite and activated zeolite-like structural material have been used for selective removal of gaseous products by means of adsorption [2]. Unfortunately, the volume of noble gas trapping in the activated carbon and zeolites are far from that ideally required for nuclear applications and they only operate at relatively low temperatures (below or around room temperature) [3].

Metal-organic frameworks (MOFs) have more recently been developed. The working principles of MOFs are developing polarized metal-ligand bonds, which can induce the polarization of Xe atoms and preferentially adsorb Xe against less polarizable He atoms by van der Walls interaction. Moreover, the pore size and electronegativity of metal centers in MOFs can be tuned to optimize Xe/Kr adsorption by the design of ligands and metal centers, thus render great potential for MOFs as fission gas adsorber. MOFs, however, suffer from only being able to retain the noble gas at and around room temperature conditions. Slightly increasing the temperature will allow the adsorbed gases to escape, thus nullifying the material adsorption properties. In addition, MOFs generally have very complex crystalline structure not only difficult and expensive to produce, but also difficult to maintain stability especially inside a neutron radiation environment.

SUMMARY

In embodiments, a method of making an adsorptive material for adsorption of a noble gas can include: heating the mesoporous support in an oven at a temperature range of about 100° C. to about 200° C. for about 1 to about 10 hours to form a baked mesoporous support; depositing at least two precursors onto the baked mesoporous support using one or more cycles of atomic layer deposition to form a pattern of metal atoms, wherein each cycle of atomic layer deposition comprises a pulse from each of the at least two precursors, with a purge pulse between each pulse; and heating the coated mesoporous support in an oven at a temperature of about 150° C. to about 250° C. for about 1 hours to about 5 hours to form the adsorptive material. The mesoporous support has a plurality of pores and the pattern of metal atoms is disposed along one or more surfaces of one or more of the plurality of pores and does not block access by a noble gas into the one or more of the plurality of pores.

In embodiments, an adsorptive material for adsorption of a noble gas can include a mesoporous support material having a plurality of pores; and a pattern of metal atoms deposited onto the mesoporous support material such that the pattern of metal atoms infiltrates the plurality of pores of the mesoporous support. The pattern of metal atoms can cover at least about 60% of the surface area of the mesoporous support. For example the pattern of metal atoms can cover about 60% to about 70% or about 60% to about 70% of the surface area of the mesoporous support.

DETAILED DESCRIPTION

A noble gas can be adsorbed on a surface via van der Waals force. The induction of polarization of noble gas atoms can enhance this attraction. This attraction force keeps the gas atom on the surface. The initial adsorption energy [Eo] released by the very first particle arriving at the clean surface is a characteristic quantity for any given adsorption system and reflects the principle strength of the interaction between the substrate and the adsorbant. For example, Xe adsorbed over palladium metal surface releases ~207 to 415 meV, whereas $H_2$ over Palladium releases ~311 to 1,036 meV [7]. For materials like MOFs the maximum adsorption energy achieved for Xe is ~280 meV.

In accordance with embodiments of the disclosure, an adsorptive material having a surface that can be modulated to produce strong polarization forces is provided. In embodiments, the adsorptive material includes a mesoporous support onto which a pattern of metal atoms is selectively deposited. In embodiments, the pattern of metal atoms can include an alternating pattern of two or more metal atoms. In embodiments, the pattern of metal atoms can be a single metal atom type.

Figure 1A:
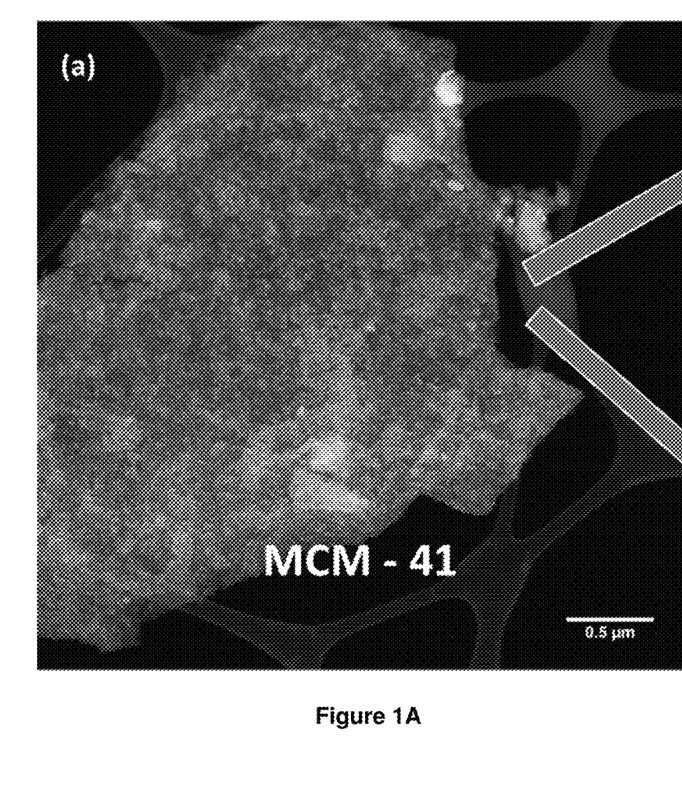
FIG. 1A is an FEG-SEM image of the mesoporous material MCM-41.
Figure 1B:
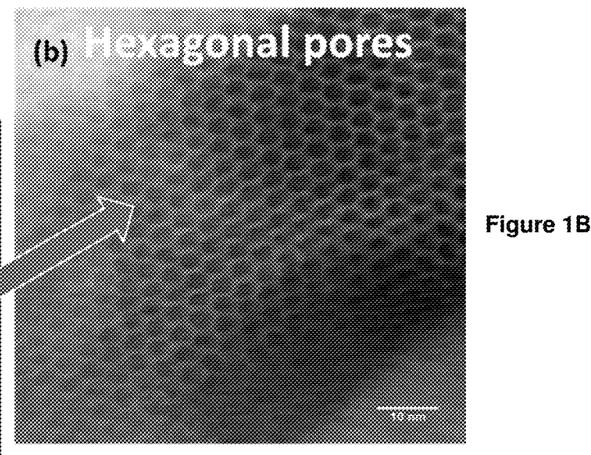
FIG. 1B is a TEM cross-section image of the mesoporous material of FIG. 1A.
Figure 1C:
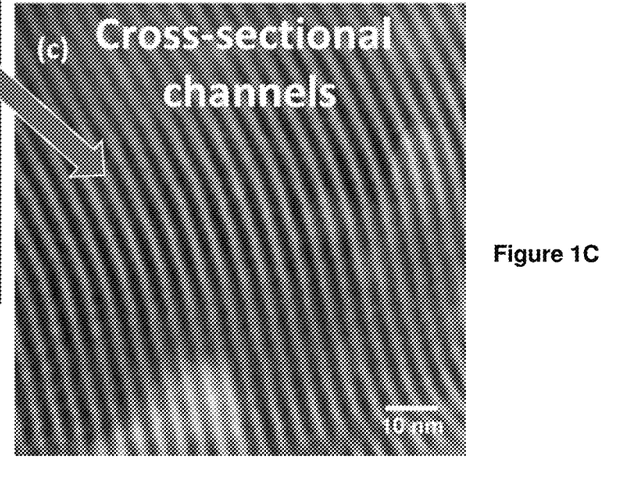
FIG. 1C is a TEM cross-section image of the mesoporous material of FIG. 1A.
Figures 2A, 2B, 2C:
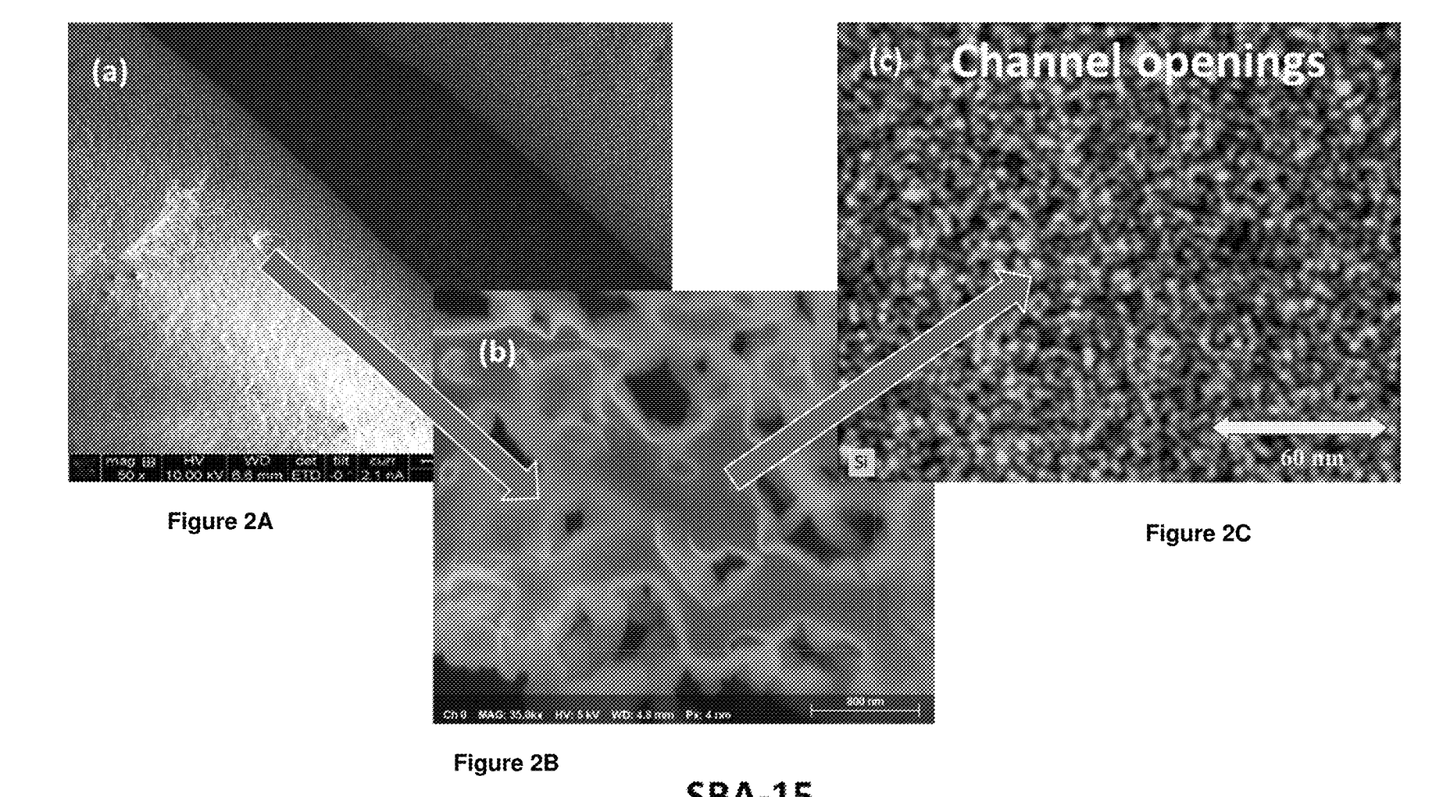
FIG. 2A is an FEG-SEM image of the mesoporous material SBA-15.
FIG. 2B is a TEM cross-section image of the mesoporous material of FIG. 2A.
FIG. 2C is a TEM elemental mapping of Si to show the mesoporous characteristic of the SBA-15.

Referring to FIGS. 1A-1C1B, FEG-SEM and TEM images of a commercial available mesoporous support MCM-41 is illustrated showing a hexagonal pore structure and a channel structure. As shown in FIG. 1B, the support has a hexagonal pore distribution, with pore diameters of about 3 to 5 nm. FIGS. 2A-2C illustrate another commercial available mesoporous support SBA-15. As shown in FIG. 2B, SBA-15 similarly has a hexagonal pore distribution, but with larger pore sizes of 10-15 nm. Other known mesoporous materials can also be used herein.

In embodiments, the mesoporous material is an inorganic material. The mesoporous support can be various known commercially available materials, including, but not limited to MCM-41, TUD-1, HMM033, FSM-16 and SBA-15. In various embodiments, the mesoporous support can include one or more of saponite, $SiO_2$, $TiO_2$, $Al_2O_3$, and $ZrO_2$.

The mesoporous support includes a plurality of pores. The pores can have an average diameter of about 5 nm to about 40 nm, about 10 nm to about 20 nm, about 5 nm to about 10 nm, about 15 nm to about 40 nm. Other suitable average diameters include about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 nm. In embodiments, a pore size can be selected to ensure sufficient radiation tolerance for a given application of the adsorptive material.

The pores can have a length extending through an entirety or through a portion of the thickness of the mesoporous material. In embodiments, the pores can have a length of about 30 μm to about 150 μm, about 50 μm to about 100 μm, about 30 μm to about 45 μm, about 100 μm to about 150 μm, about 75 μm to about 125 μm, and about 40 μm to about 90 μm. Other suitable lengths include about 30, 35, 40, 45, 50, 55, 60, 65, 70, 75, 80, 85, 90, 95, 100, 105, 110, 115, 120, 125, 130, 135, 140, 145, and 150 μm.

Figure 3A:
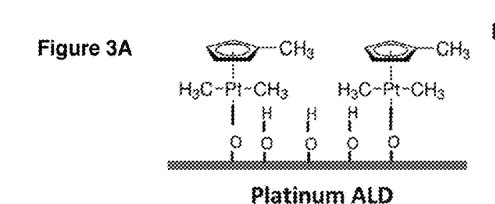
FIGS. 3A-3D are schematic illustrations of a selective coating method in accordance with embodiments of the disclosure.
Figure 3B:
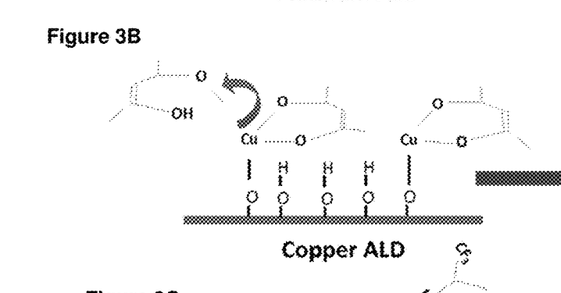
Figure 3C:
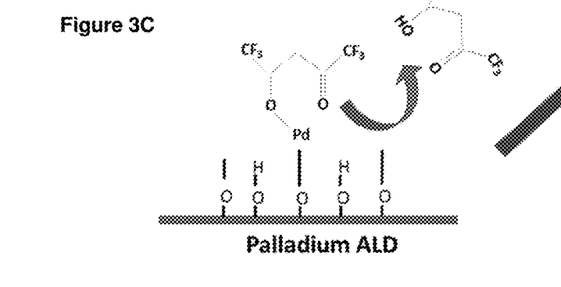
Figure 3D:
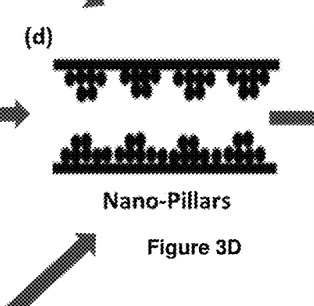
Figure 3E:
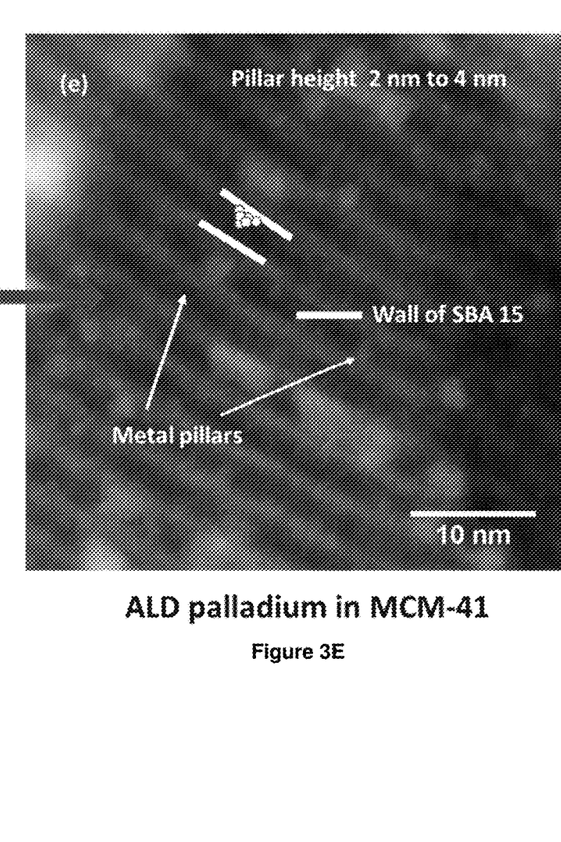
FIG. 3E is a TEM image of a mesoporous material in accordance with embodiments of the disclosure.

In embodiments, a precursor for atomic layer deposition can be selected to have large ligands to block reactive sites around and prevent clogging of the pore during deposition. FIG. 3A is a schematic illustration of Pt deposited in a pore of a mesoporous material illustrating that deposition occurs on the surface, while allowing access by a gas through the length of the pore. This advantageously maintains high surface areas for sorption.

In embodiments, the mesoporous support can be surface treated. For example, the mesoporous support can be doped. Suitable doping agents include one or more of Cu, Pt, Au, Ag, and Pd. In embodiments, the mesoporous support can be surface treated prior to deposition of the metal atoms to aid in formation of the metal atom layer during atomic layer deposition, for example. For example, a mesoporous material can be surface treated with a layer of platinum to aid in deposition of Pd through atomic layer deposition.

In embodiments, the surface treatment of the mesoporous support can be done selectively. In embodiments, selective surface treatment can be used to tailor the pattern of metal atoms. In embodiments, masking or other temporary surface treatments can be used alone or in combination with permanent surface modifications to tailor the pattern of metal atoms.

In embodiments, the metal atoms include one or more of Pt, Pd, Cu, Au, Ag, and Al.

In embodiments, the metal pattern includes an alternating set of two or more types of metal atoms. The alternating set of two or more metals can be provided as a multilayer structure having any desired repeat pattern. For example, two types of metal atoms can be provided in an AB, AB, etc. repeating pattern. In embodiments, the alternating metal atoms are Pt and Pd, or Pt and Cu, or Cu and Pd.

The adsorption energy $E_o$ value of pure metal surfaces comprising palladium, platinum and copper are known to be quite high, making them particularly useful in adsorption of noble gasses. See D. L. Chen, J. Phys.: Condense Matter 24, (2012), 424211. However, pure metal surfaces suffer from low surface areas, leading to low adsorption capacities.

In embodiments, the pattern of metal atoms can include triangular structures providing changes in surface roughness along the length of a pore. Methods of the disclosure advantageously allow such patterns of metal atoms to be formed within, i.e., infiltrating, the pores of the mesoporous material, thereby providing a high surface area over which adsorption can occur.

Advantageously, it has been found that adsorptive materials in accordance with the disclosure can be heat stable—that is capable of resisting degradation when heated under typical operating conditions and able to retain adsorbed gasses when heated under typical operating conditions, which are generally elevated temperatures, above room temperature. Methods of depositing the pattern of metal atoms in accordance with embodiments of the disclosure can result in chemical bond formation between the metal atoms and the surface of the mesoporous support. This keeps the metal atoms strongly adhered to the mesoporous surface even when exposed to high temperatures. For example, the adsorptive materials can be heat stable at temperatures up to 600° C. In embodiments, the adsorptive materials can be heat stable at temperatures of 450° C. to 600° C.

In various embodiments, the metal atom is deposited into the mesoporous support using area-selective atomic layer deposition. It has been advantageously found that methods in accordance with embodiments of the disclosure can allow for deposition of the metal atoms within the surfaces of the pores of the mesoporous support and along all or substantially all of the length of the pore. This advantageously increases the amount of surface area available for adsorption.

In embodiments, the resulting adsorptive materials can have a surface area for sorption of about 500 $m^2/g$ to about 1000 $m^2/g$, about 800 $m^2/g$ to about 900 $m^2/g$, about 600 $m^2/g$ to about 750 $m^2/g$, and about 500 $m^2/g$ to about 650 $m^2/g$. Other suitable surface areas include about 500, 525, 550, 575, 600, 625, 650, 675, 700, 725, 750, 775, 800, 825, 850, 875, 900, 925, 950, 975, and 1000 $m^2/g$.

In embodiments, selection of the precursor material for the atomic layer deposition can be used to tailor the surface coverage and/or prevent clogging of the pores during deposition. For example, the precursors can have a size of about 0.5 nm to about 1.2 nm so as to capable of infiltrating into the pores of the mesoporous materials. Precursors for use in the method can have a size and shape that allows them to develop pillar shape structures after being deposited within the pores. Additionally, the pillar structure can results from the precursors having large ligands that cover neighboring surface reaction sites and blocks another precursor molecule from reacting.

Suitable precursors include one or more of Palladium (II) hexafluoroacetylacetonate, Trimethyl(methylcyclopentadienyl)platinum(IV), Bis(2,2,6,6-tetramethyl-3,5-heptanedionato)palladium(II), Allyl (cyclopentadienyl) palladium (II), Platinum(II) acetylacetonate, Platinum(II) hexafluoroacetylacetonate, (Trimethyl)cyclopentadienylplatinum(IV), (Trimethyl)pentamethylcyclopentadienylplatinum(IV), 2,2,6,6-Tetramethyl-3,5-heptanedionato silver(I), Triethoxyphosphine(trifluoroacetylacetonate)silver(I), Triethylphosphine(6,6,7,7,8,8,8-heptafluoro-2,2-dimethyl-3,5-octanedione)silver(I), Bis(t-butylacetoacetato)copper(II), Copper(II) hexafluoroacetylacetonate, Bis(2,2,6,6-tetramethyl-3,5-heptanedionato)copper(II), and Dimethyl (acetylacetonate)gold(III).

In embodiments, prior to deposition the mesoporous support material can be baked. For example, the precursor material can be baked at a temperature of about 100° C. to about 200° C., about 100° C. to about 150° C., about 100° C. to about 120° C., about 110° C. to about 150° C., about 110° C. to about 130° C., or about 150° C. to about 200° C. Other suitable temperatures include about 100, 105, 110, 115, 120, 125, 130, 135, 140, 145, 150, 155, 160, 165, 170, 175, 180, 185, 190, 195, or 200° C. The mesoporous support material can be pre-baked for about 1 hour to about 10 hours, about 2 hours to about 6 hours, about 3 hours to about 8 hours, or about 4 hours to about 7 hours. Other suitable times include about 1, 2, 3, 4, 5, 6, 7, 8, 9, or 10 hours. Baking of the mesoporous support material prior to deposition can advantageously remove volatile materials and moisture from the channels/pores of the mesoporous materials, improving access by the metal atoms for infiltration into the pores during deposition.

In embodiments, the metal atoms are deposited using one or more cycles of atomic layer deposition. For example, an atomic layer deposition cycle can include alternatingly depositing two metal atoms from two precursor materials. For example, the pulsing order can be A B, A B, . . . repeated a sufficient number of times to achieve the desired thickness, where A is a first precursor pulse and B is a second precursor pulse. In embodiments, each pulse can be followed by purge cycle. This can remove excess unreacted chemicals from the system along with the unwanted reaction products.

Each precursor pulse in the atomic layer deposition process can be about 5 second to about 60 seconds, about 10 seconds to about 40 seconds, about 30 seconds to about 50 seconds, or about 5 seconds to about 25 seconds Other suitable times include about 5, 6, 7, 8, 9, 10, 12, 14, 16, 18, 20, 22, 24, 26, 28, 30, 32, 34, 36, 38, 40, 42, 44, 46, 48, 50, 52, 54, 56, 58, or 60 seconds.

A deposition cycle can include a single precursor pulse from each metal atom to be deposited. For example, in embodiments in which two different metal atoms are deposited, a cycle can include a single precursor pulse from each of the precursors for the two different metals, e.g., one cycle is A B, with A representing the precursor pulse for a first metal atom and B representing the precursor pulse for a second metal atom. Any suitable number of metal atoms from any number of precursors can be deposited. Further, any number of cycles can be used depending on the thickness of the ultimate coating that is desired. For example, the deposition process can include about 2 to about 20 cycles.

In embodiment, the system can be purged between precursor pulses. The purge can be about 10 seconds to about 90 seconds, about 30 seconds to about 60 seconds, about 50 seconds to about 80 seconds, or about 60 seconds to about 90 seconds. Other suitable purge times include about 10, 15, 20, 30, 35, 40, 45, 50, 55, 60, 65, 70, 75, 80, 85, and 90 seconds.

The methods of the disclosure can result in various surface heights of the deposited metal atom. Such surface roughness imparted by the deposition process can further enhance the sorptive capacity of the adsorptive materials of the disclosure by providing even more surface area over which sorption can occur. In embodiments, the deposited metal atom layer can have a surface roughness of about 2 nm to about 10 nm, about 2 nm to about 5 nm, about 3 nm to about 7 nm, about 6 nm to about 10 nm, and about 4 nm to about 8 nm. Other suitable surface roughness values include about 2, 3, 4, 5, 6, 7, 9, and 10 nm. Methods in accordance with the disclosure can allow for tailoring of the degree of surface roughness as well as the regions of increased surface roughness.

In embodiments, the pattern of metal atoms is deposited to an average thickness of about 2 nm to about 10 nm, about 2 nm to about 5 nm, about 3 nm to about 7 nm, about 6 nm to about 10 nm, and about 4 nm to about 8 nm. Other suitable surface roughness values include about 2, 3, 4, 5, 6, 7, 9, and 10 nm. In embodiments, the thickness can vary over the pattern of metal atoms having a variation of thickness between 2 nm and 10 nm.

In embodiments, the pattern of metal atoms is deposited to extend substantially through or entirely through one or more of the plurality of pores. For example, the pattern of metal atom can be deposited to cover up to 85% of the surface area of the mesoporous support, as calculated from TEM cross sectional measurements. For example, the pattern of metal atoms can cover at least about 25%, at least about 30%, at least about 35%, at least about 40%, at least about 45%, at least about 50%, at least about 55%, at least about 60%, at least about 65%, at least about 70%, at least about 75%, and up to 85%. In embodiments, the pattern of metal atoms can cover about 25% to about 85%, about 50% to about 80%, about 60% to about 80%, about 60% to about 70%, about 30% to about 50%, about 25% to about 65%, about 25% to about 35% of the surface area of the mesoporous support, as calculated from TEM cross sectional measurements. Other suitable values include about 25, 30, 35, 40, 45, 50, 55, 60, 65, 70, 75, 80, and 85% of the surface area of the mesoporous support, as calculated from TEM cross-sectional measurements.

In embodiments, the pattern can include two or more distinct metal atoms that are selectively deposited on respective portions of the mesoporous support. In addition or alternative embodiments, alternating layers of two or more distinct metal atoms can be deposited in a multi-layer structure on the same portions of the mesoporous support. Deposition of the two or more distinct metals can be deposited in a single ALD deposition set-up when depositing a multi-layer structure, for example.

In various embodiments, the adsorptive materials described herein can be used to adsorb fission gasses from a fuel element. In embodiments, the adsorptive materials can adsorb fission gasses, such as xenon at temperatures above room temperature, while retaining entrapped xenon at such elevated temperatures. Other gasses, such as noble gasses can be adsorbed by the adsorptive materials of the disclosure. For example, the adsorptive materials disclosed herein can be used for adsorption of one or more of helium, neon, argon, krypton, xenon, and radon. For example, an adsorptive material in accordance with the disclosure can be capable of adsorbing about 1 mmol/g to about 3.5 mmol/g Xenon.

Figure 4:
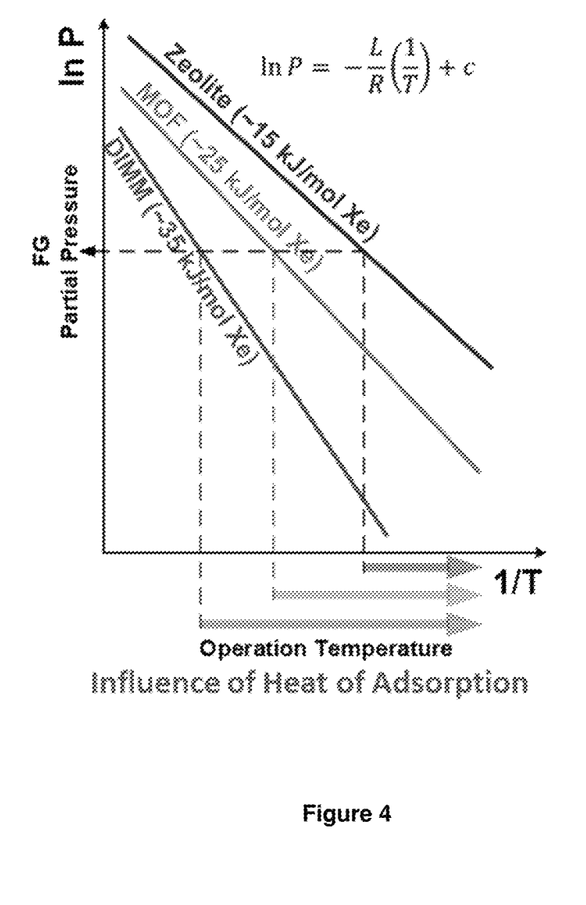
FIG. 4 is a graph illustrating a theoretical comparison of the influence of heat of adsorption for a mesoporous material in accordance with the disclosure to commercially available zeolites and MOF structures.

FIG. 4 illustrates a theoretical comparison of the influence of heat of adsorption for a mesoporous material in accordance with the disclosure (DIMM in the figure) to commercially available zeolites and MOF structures. The Clausius-Clapeyron equation, $\ln P = -L/R(1/T) + c$, is the transition between a gas and a condensed phase, where c is a constant and for the liquid-gas transition (gaseous Xe to solid form of X when absorbed) L is the specific latent heat (or specific enthalpy) of vaporization) and for a solid-gas transition is the specific latent heat of sublimation. FIG. 4 illustrates the stability of the newly condensed Xe phase when Xe gas is adsorbed from the condensed phase or a solid atomic layer onto an adsorptive material as a function of temperature—the material of the disclosure, a commercial MOF, or a commercial Zeolite. FIG. 4 shows that materials of the disclosure can stably adsorb Xe at higher operating temperatures.

EXAMPLES

Example 1: ALD Platinum Infiltration

MCM-41 powder was used as a mesoporous support. 2.5 grams of MCM-41 powder was baked in an oven at 120° C. for 5 hours prior to ALD deposition of the metal atoms.

Trimethyl(methylcyclopentadienyl)platinum (IV) was used as a Pt metal precursor for ALD deposition onto the mesoporous support. The ALD process was performed using alternating precursor pulses from the Pt metal precursor and an $O_2$ gas precursor. Deposition was performed at a temperature range of about 280° C. to about 300° C. Pulse time for each precursor was 10 seconds and a purge of 60 seconds was preformed between pulses. It was found that 5-10 cycles of ALD was needed to form a 1 nm to 2 nm thick metal coating.

Example 2: ALD Palladium Infiltration

MCM-41 powder was used as a mesoporous support. 2.5 grams of MCM-41 powder was baked in an oven at 120° C. for 5 hours prior to ALD deposition of the metal atoms. The MCM-41 powder was surface treated with a layer of platinum, which is known to help break $H_2$ into H and help reduce metal organic Pd precursor into its metallic state.

Palladium (II) hexafluoroacteylacetonate was used as a Pd metal precursor for ALD deposition onto the mesoporous support. The ALD process was performed using alternating precursor pulses from the Pd metal precursor and an $H_2$ gas precursor. In each pulse, a 10 second pulse duration was performed twice. Deposition was performed at a temperature range of about 180° C. to about 220° C. A purge of 60 seconds was preformed between pulses. 45 cycles were performed. The thickness ranged from 3 to 5 nm.

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

REFERENCES

1) D. L. Chen, J. Phys.: Condense Matter 24, (2012), 424211
2) Pershina et. al. J. Chem. Phys. 129, 144106 2008
3) Zhengwen Li, Antti Rahtu, Journal of The Electrochemical Society, 153, 11, C787-C794, 2006.
4) Matthieu J. Weber et. al., J. Phys. Chem. C2014, 118, 8702-8711.
5) Titta Aaltonen et. al., Chem. Mater. 2003, 15, 1924-1928.
6) Maarit Makela et. al., Chem. Mater. 2017, 29, 2040-2045.
7) Matthew B. E. Griffiths et. al., Chem. Mater. 2016, 28, 44-46.

What is claimed:

1. An adsorptive material for adsorption of a noble gas, comprising:
a mesoporous support material having a plurality of pores; and
a pattern of metal atoms deposited onto the mesoporous support material such that the pattern of metal atoms infiltrates the plurality of pores of the mesoporous support.

2. The adsorptive material of claim 1, wherein the pattern of metal atoms is an alternating set of at least two types of metal atoms.

3. The adsorption material of claim 1, wherein the mesoporous support is doped with one or more of Cu, Pt, Au, Ag, and Pd.

4. The adsorptive material of claim 1, wherein the mesoporous support comprises one or more of saponite, $SiO_2$, $TiO_2$, $Al_2O_3$, and $ZrO_2$.

5. The adsorptive material of claim 1, wherein the adsorptive material has a surface area for sorption of a noble gas of 500 $m^2/g$ to 1000 $m^2/g$.

6. The adsorptive material of claim 1, wherein the pattern of metal atoms covers at least about 60% of a surface area of the mesoporous support.

7. The adsorptive material of claim 1, wherein the adsorptive material is heat stable to a temperature of up to about 600° C.

8. The adsorptive material of claim 1, wherein the adsorptive material has an adsorption capacity for Xenon of about 1 mmol/g to about 3.5 mmol/g.

9. The adsorptive material of claim 1, wherein the pattern of metal atoms has an average thickness of about 2 nm to about 10 nm.

10. The adsorptive material of claim 1, wherein the metal atoms comprise one or more of Pt, Pd, Cu, Au, Ag and Al.

11. The adsorptive material claim 1, wherein the pattern of metal atoms comprises a plurality of pillar structures.

12. A method of adsorbing a noble gas comprising exposing the gas to the adsorptive material of claim 1.

13. The method of claim 12, wherein the adsorptive material adsorbs the gas and retains adsorbed gas at temperature of up to 600° C.

* * * * *